US010882380B2

(12) United States Patent
Shin et al.

(10) Patent No.: US 10,882,380 B2
(45) Date of Patent: Jan. 5, 2021

(54) AIR CONDITIONING UNIT FOR A VEHICLE (71) Applicants: HYUNDAI MOTOR COMPANY, Seoul (KR); KIA MOTORS CORPORATION, Seoul (KR); Hanon Systems, Daejeon (KR)

(72) Inventors: Gee Young Shin, Suwon-si (KR); Dae Ig Jung, Suwon-si (KR); Dong Ho Kwon, Yongin-si (KR); Seung Hyeok Chang, Suwon-si (KR); Sung Je Lee, Daejeon (KR); Jae Chun Ryu, Daejeon (KR); Yun Jin Kim, Daejeon (KR)

(73) Assignees: HYUNDAI MOTOR COMPANY, Seoul (KR); KIA MOTORS CORPORATION, Seoul (KR); Hanon Systems, Daejeon (KR)

( * ) Notice: Subject to any disclaimer, the term of this patent is extended or adjusted under 35 U.S.C. 154(b) by 133 days.

(21) Appl. No.: 16/387,149

(22) Filed: Apr. 17, 2019

(65) Prior Publication Data
US 2020/0148035 A1     May 14, 2020

(30) Foreign Application Priority Data

Nov. 12, 2018   (KR) ........................ 10-2018-0138534

(51) Int. Cl.
*B60H 1/22*    (2006.01)
*B60H 1/00*    (2006.01)
*B60H 1/32*    (2006.01)

(52) U.S. Cl.
CPC ........... *B60H 1/22* (2013.01); *B60H 1/00392* (2013.01); *B60H 1/00485* (2013.01);
(Continued)

(58) Field of Classification Search
CPC .. B60H 1/22; B60H 1/00392; B60H 1/00485; B60H 1/00564; B60H 1/00671; B60H 1/3227; B60H 1/32281; B60H 1/00899; B60H 2001/2287; B60H 2001/00721; B60H 2001/00928; B60H 2001/2281;
(Continued)

(56) References Cited

U.S. PATENT DOCUMENTS 3,105,431 A * 10/1963 Stratton ............. B60H 1/00071
454/148
4,842,047 A * 6/1989 Sakurada ........... B60H 1/00064
165/43
(Continued)

FOREIGN PATENT DOCUMENTS

DE   102012004655 A1 * 9/2013   ............... B60H 1/24
EP       0214605 A2 * 3/1987   ............. B60H 1/247
KR      101903143 B1   10/2018

*Primary Examiner* — Ljiljana V. Ciric
(74) *Attorney, Agent, or Firm* — Lempia Summerfield Katz LLC (57) ABSTRACT An air conditioning unit for a vehicle includes a first channel and a second channel, a blowing unit including a first blower fan and a second blower fan that rotate together by sharing a rotary shaft and a driving unit, a bypass channel, and a control door disposed among the outlets of the first channel and the second channel, the heating core, and the bypass channel to control air discharged from the first channel or the second channel to pass through the heating core or not to pass through the heating core through the bypass channel.

12 Claims, 9 Drawing Sheets

(52) U.S. Cl.
CPC ..... B60H 1/00564 (2013.01); B60H 1/00671 (2013.01); B60H 1/00899 (2013.01); B60H 1/3227 (2013.01); B60H 1/32281 (2019.05); B60H 2001/00721 (2013.01); B60H 2001/00928 (2013.01); B60H 2001/2281 (2013.01); B60H 2001/2287 (2013.01)

(58) Field of Classification Search
CPC ........... B60H 2001/00085; B60H 2001/00178; B60H 2001/00092; B60H 1/0005
USPC ................ 165/202, 203, 204, 41, 42, 43, 44
See application file for complete search history.

(56) References Cited

U.S. PATENT DOCUMENTS

| | | | | |
|---|---|---|---|---|
| 4,913,347 | A * | 4/1990 | Burst | B60H 1/00007 165/43 |
| 5,316,074 | A * | 5/1994 | Isaji | B60H 1/00392 165/43 |
| 5,582,236 | A * | 12/1996 | Eike | B60H 1/00014 165/42 |
| 5,685,162 | A * | 11/1997 | Iritani | B60H 1/00021 62/156 |
| 5,857,905 | A * | 1/1999 | Uemura | B60H 1/00064 165/42 |
| 5,934,988 | A * | 8/1999 | Fischer | B60H 1/00028 454/121 |
| 6,308,770 | B1 * | 10/2001 | Shikata | B60H 1/00064 165/126 |
| 6,360,958 | B1 * | 3/2002 | Ito | B60H 1/00485 165/271 |
| 6,430,951 | B1 * | 8/2002 | Iritani | B60H 1/00021 62/229 |
| 8,408,980 | B2 * | 4/2013 | Nanaumi | B60H 1/00842 454/121 |
| 2002/0084058 | A1 * | 7/2002 | Ozeki | B60H 1/00692 165/42 |
| 2005/0072554 | A1 * | 4/2005 | Shindo | B60H 1/00207 165/42 |
| 2008/0245088 | A1 * | 10/2008 | Ito | B60H 1/00028 62/244 |
| 2009/0193830 | A1 * | 8/2009 | Yoshioka | B60H 1/323 62/239 |
| 2011/0005710 | A1 * | 1/2011 | Nanaumi | B60H 1/00828 165/61 |
| 2011/0005732 | A1 * | 1/2011 | Seto | F28D 1/05391 165/121 |
| 2011/0073273 | A1 * | 3/2011 | Seto | F28D 1/05391 165/42 |
| 2012/0241126 | A1 * | 9/2012 | Kishi | B60H 1/008 165/42 |
| 2014/0075973 | A1 * | 3/2014 | Graaf | B60H 1/00057 62/115 |
| 2014/0075974 | A1 * | 3/2014 | Klein | B60H 1/00057 62/119 |
| 2014/0075975 | A1 * | 3/2014 | Graaf | B60H 1/0005 62/119 |
| 2015/0082820 | A1 * | 3/2015 | Takahashi | B60H 1/0005 62/238.7 |
| 2015/0283876 | A1 * | 10/2015 | Froehling | B60H 1/00335 165/121 |
| 2016/0185185 | A1 * | 6/2016 | Suzuki | B60L 1/02 237/5 |
| 2016/0207371 | A1 * | 7/2016 | Della Rovere | B60H 1/00328 |
| 2016/0221414 | A1 * | 8/2016 | Nakamura | B60H 1/00428 |
| 2016/0229266 | A1 * | 8/2016 | Maeda | B60H 1/00849 |
| 2017/0043646 | A1 * | 2/2017 | Lee | B60H 1/0005 |
| 2017/0129309 | A1 * | 5/2017 | Lee | F25B 6/02 |
| 2017/0190236 | A1 * | 7/2017 | Lee | B60H 1/00057 |
| 2017/0203631 | A1 * | 7/2017 | Ryu | B60H 1/00028 |
| 2017/0217278 | A1 * | 8/2017 | Richter | B60H 1/00057 |
| 2017/0299232 | A1 * | 10/2017 | Richter | B60H 1/00057 |
| 2017/0305230 | A1 * | 10/2017 | Sekito | B60H 1/00057 |
| 2018/0111445 | A1 * | 4/2018 | Ryu | F04D 29/4226 |
| 2018/0126820 | A1 * | 5/2018 | Makimoto | B60H 1/00835 |
| 2018/0290516 | A1 * | 10/2018 | Ryu | B60H 1/00021 |
| 2018/0361819 | A1 * | 12/2018 | Ryu | B60H 1/00064 |
| 2019/0077223 | A1 * | 3/2019 | Ishizeki | B60H 1/3216 |
| 2019/0248209 | A1 * | 8/2019 | Ishizeki | B60H 1/32 |
| 2019/0263223 | A1 * | 8/2019 | Durrani | B60H 1/00278 |
| 2020/0031197 | A1 * | 1/2020 | Ryu | B60H 1/00849 |
| 2020/0055376 | A1 * | 2/2020 | Narahara | B60H 1/00564 |
| 2020/0122544 | A1 * | 4/2020 | Ishizeki | B60H 1/143 |
| 2020/0148024 | A1 * | 5/2020 | Ishizeki | B60H 1/22 |
| 2020/0171919 | A1 * | 6/2020 | Ishizeki | F25B 6/04 |
| 2020/0180401 | A1 * | 6/2020 | Aoki | B60H 1/03 |
| 2020/0207182 | A1 * | 7/2020 | Ishizeki | B60H 1/22 |
| 2020/0215872 | A1 * | 7/2020 | Han | B60H 1/00842 |
| 2020/0223282 | A1 * | 7/2020 | Maeda | B60H 1/00064 |
| 2020/0223289 | A1 * | 7/2020 | Maeda | B60H 1/00064 |

* cited by examiner

AIR CONDITIONING UNIT FOR A VEHICLE

CROSS REFERENCE TO RELATED APPLICATION

The present application claims priority to Korean Patent Application No. 10-2018-0138534, filed Nov. 12, 2018, the entire contents of which is incorporated herein for all purposes by this reference.

BACKGROUND

1. Technical Field

The present disclosure relates to an air conditioning unit for a vehicle. The air conditioning unit performs cooling/heating, while switching air channels, without using a heat pump system that changes a refrigerant. The air-conditioning unit integrates a blower motor by integrating cooling and heating systems unlike existing air conditioning systems.

2. Description of the Prior Art

An electric vehicle is required to perform heating using electrical energy because there is no specific heat source, such as an engine. To solve this problem, heat pump systems are used in the related art. These systems have complicated refrigerant/cooling water channels and low efficiency.

Accordingly, a system that maintains a refrigerant loop as a one way and, if necessary, uses cold air from an evaporator or hot air from a condenser has been studied.

However, this system also has complicated channels and doors for selecting air to be supplied to the inside of a vehicle and air to be discharged to the outside of the vehicle. Each of the channels requires a blower, thereby increasing the weight and volume of the system.

The description above is provided as a related art of the present disclosure for helping understanding of the background of the present disclosure and should not be construed as being included in the related art that is known by those having ordinary skill in the art.

SUMMARY

The present disclosure is made in order to solve the above-mentioned problems in the prior art. An aspect of the present disclosure is to provide an air conditioning unit for a vehicle. The air conditioning unit performs cooling/heating while switching air channels without using a heat pump system that changes a refrigerant and integrates a blower motor by integrating cooling and heating systems unlike existing air conditioning systems.

In view of the above aspect, an air conditioning unit for a vehicle may include: a first channel and a second channel each having inlets and outlets; a blowing unit including a first blower fan and a second blower fan that are respectively disposed in the first channel and the second channel and that rotate together by sharing a rotary shaft and a driving unit; a cooling core disposed in the first channel between the first blower fan and the inlet of the first channel; a heating core disposed at the outlets of the first channel and the second channel; a bypass channel disposed at a side of the heating core to bypass the heating core; and a control door disposed among the outlets of the first channel and the second channel, the heating core, and the bypass channel to control air discharged from the first channel or the second channel to pass through the heating core or not to pass through the heating core through the bypass channel.

A first opening door that communicates with the outside may be disposed at the outlet of the first channel. Air that has passed through the cooling core may be discharged to the outside when the first opening door is opened. The air that has passed through the cooling core may be discharged to the control door when the first opening door is closed.

A second opening door that communicates with the outside may be disposed at a downstream position from the heating core. Air that has passed through the heating core may be discharged to the outside when the second opening door is opened. The air that has passed through the heating core may be discharged to the inside of the vehicle when the second opening door is closed.

The cooling core and the heating core may be, respectively, an evaporator and a condenser that are connected through a refrigerant line. A compressor and an expansion valve may be disposed in the refrigerant line.

The air conditioning unit for the vehicle may further include an intake housing and a discharge housing coupled to a side of the intake housing. A first intake channel and a second intake channel, each having an inlet and an outlet, may be formed in the intake housing. A blowing chamber divided into two spaces may be formed in the discharge housing. The first blower fan and the second blower fan may be disposed in the spaces of the blowing chamber, respectively. The outlet of the first intake channel may communicate with an inlet of the space in which the first blower fan is disposed, thereby forming the first channel. The outlet of the second intake channel may communicate with an inlet of the space in which the second blower fan is disposed, thereby forming the second channel.

The cooling core may be disposed in the first intake channel. The first blower fan may be disposed close to the intake housing in the blowing chamber. The second blower fan may be disposed far from the intake housing in the blowing chamber. The outlet of the first intake channel may be directly connected to the first blower fan. The outlet of the second intake channel may be connected to the second blower fan at the opposite side after going around the blowing chamber.

The intake housing may be coupled to a side of the discharge housing. The driving unit for the blowing unit may be coupled to the other side of the discharge housing.

The intake housing may be divided into the first intake channel and the second intake channel by an intake separation wall. A selection door may be disposed at a downstream side of the separation wall from the cooling core, so when the selection door is opened, the first intake channel and the second intake channel may be isolated. When the selection door is closed, the air that has flowed through the cooling core may flow into the first blower fan and the second blower fan through the first intake channel and the second intake channel.

A discharge chamber for discharging air into the vehicle and mode doors installed at the discharge chamber may be provided in the discharge housing. A core chamber having the heating core therein may be formed. An inlet of the core chamber and an inlet of the bypass channel may be disposed toward the outlet of the blowing chamber. The control door may be disposed among the inlet of the core chamber, the inlet of the bypass channel, and the outlet of the blowing chamber.

The bypass channel may be formed outside the core chamber. An outlet of the bypass channel may be connected to the discharge chamber.

A second opening door that communicates with the outside may be disposed at an outlet of the core chamber. Air that has passed through the heating core may be discharged to the outside when the second opening door is opened. The air that has passed through the heating core may be discharged to the discharge chamber when the second opening door is closed.

A first opening door that communicates with the outside may be disposed at an outlet of the space in which the first blower fan is disposed in the blowing chamber. Air that has passed through the first blower fan may be discharged to the outside when the first opening door is opened. The air that has passed through the first blower fan may be discharged to the control door when the first opening door is closed.

According to the disclosed air conditioning unit for a vehicle, it is possible to perform cooling/heating while switching air channels without using a heat pump system that changes a refrigerant, and it is possible to integrate a blower motor by integrating cooling and heating systems using the air conditioning unit for the vehicle, unlike existing air conditioning systems.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EMBODIMENTS

Figure 1:
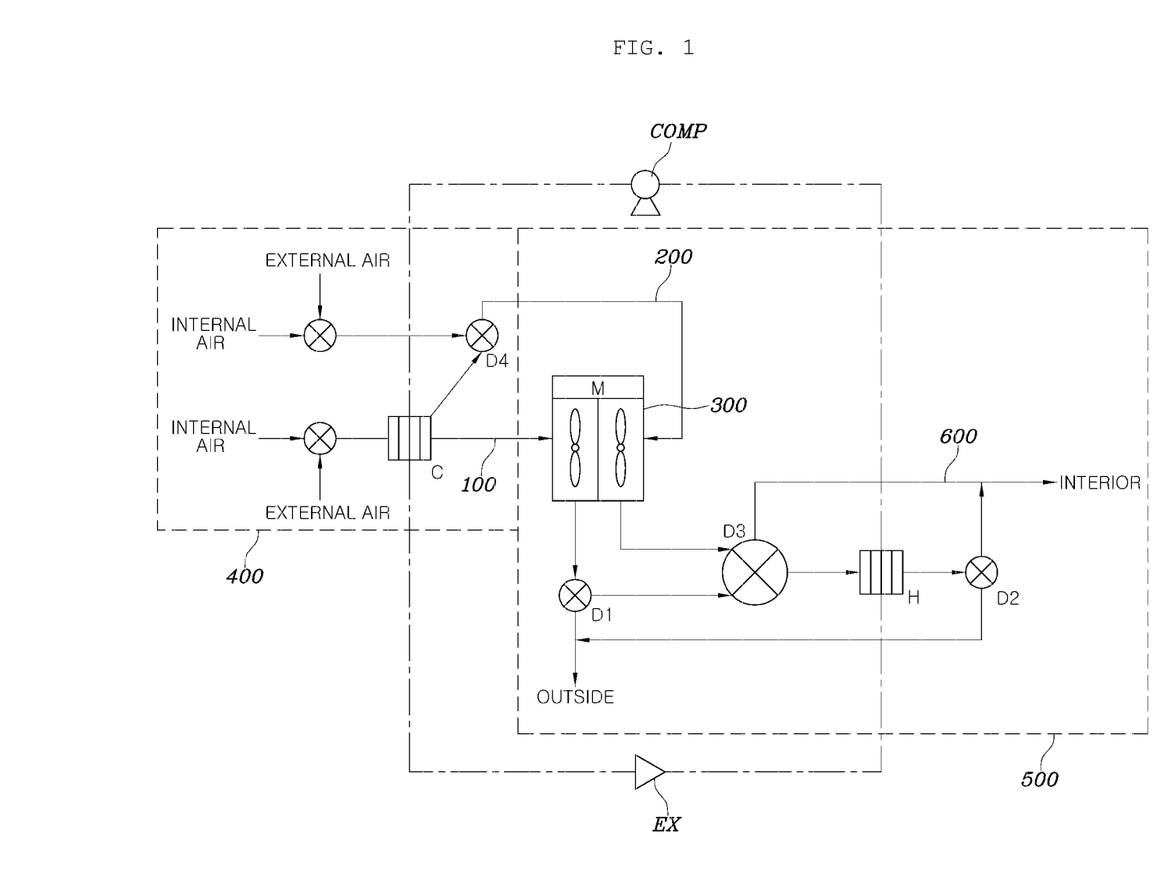
FIG. 1 is a diagram illustrating the configuration of an air conditioning unit for a vehicle according to an embodiment of the present disclosure.
Figure 2:
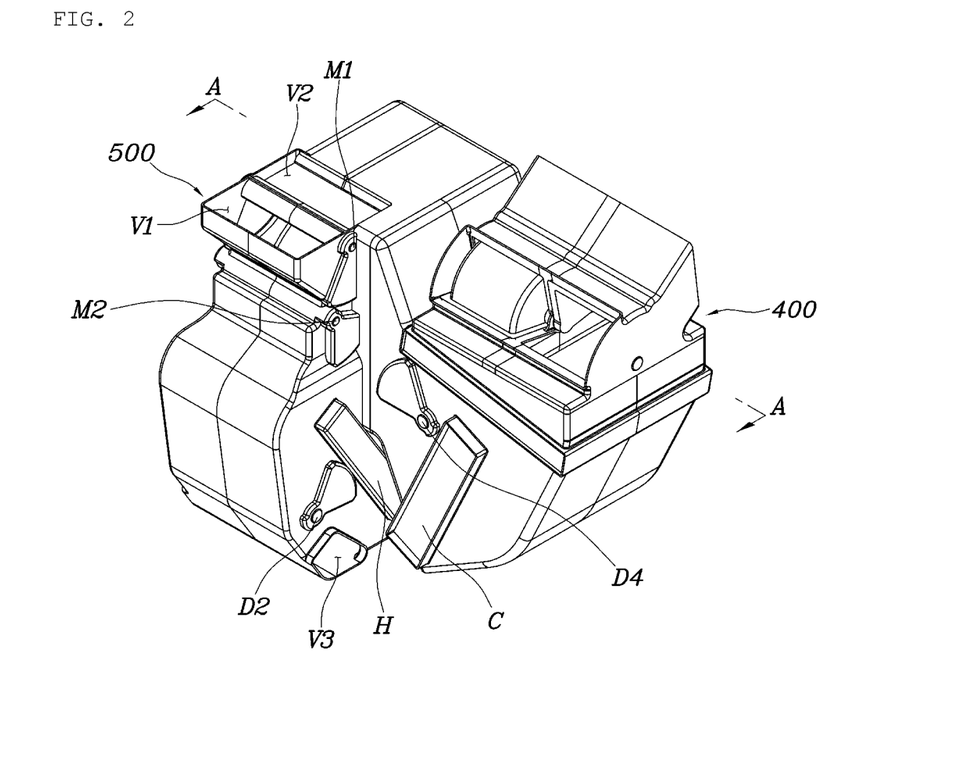
FIGS. 2 and 3 are perspective views of an air conditioning unit for a vehicle according to an embodiment of the present disclosure.
Figure 3:
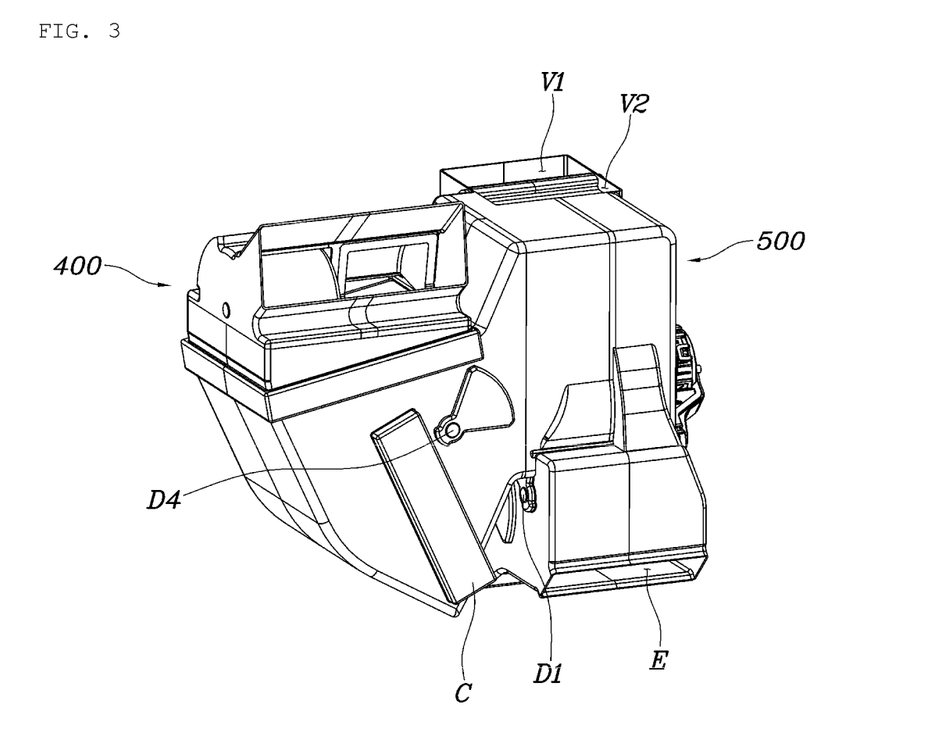
Figure 4:
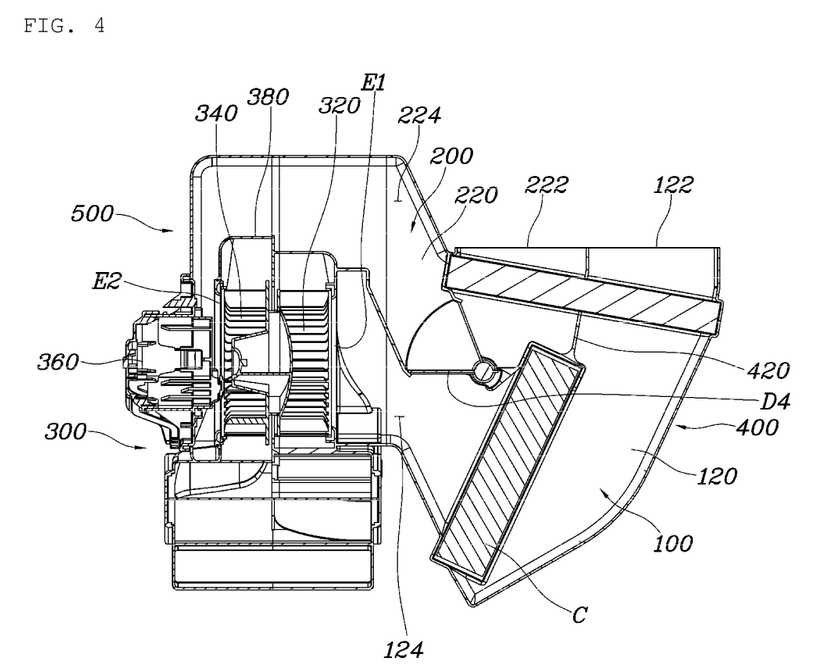
FIG. 4 is a cross-sectional view of the air conditioning unit for a vehicle taken along line A-A shown in FIG. 2.
Figure 5:
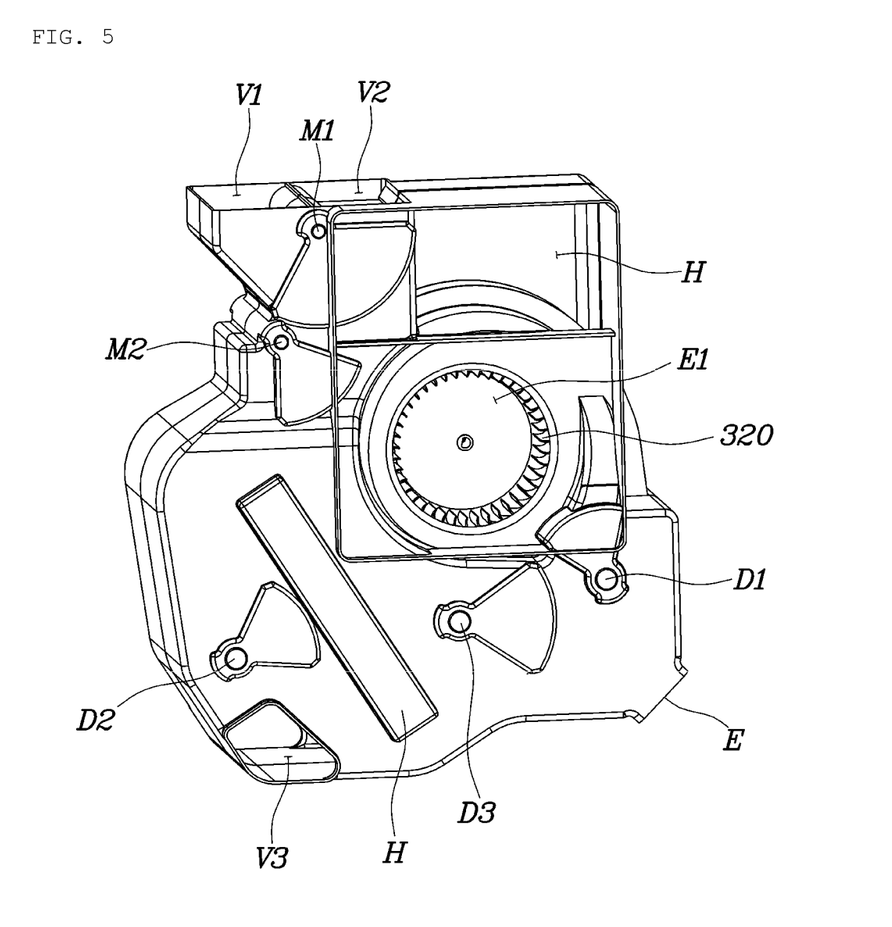
FIG. 5 is a view showing a discharge housing of the air conditioning unit for a vehicle according to an embodiment of the present disclosure.
Figure 6:
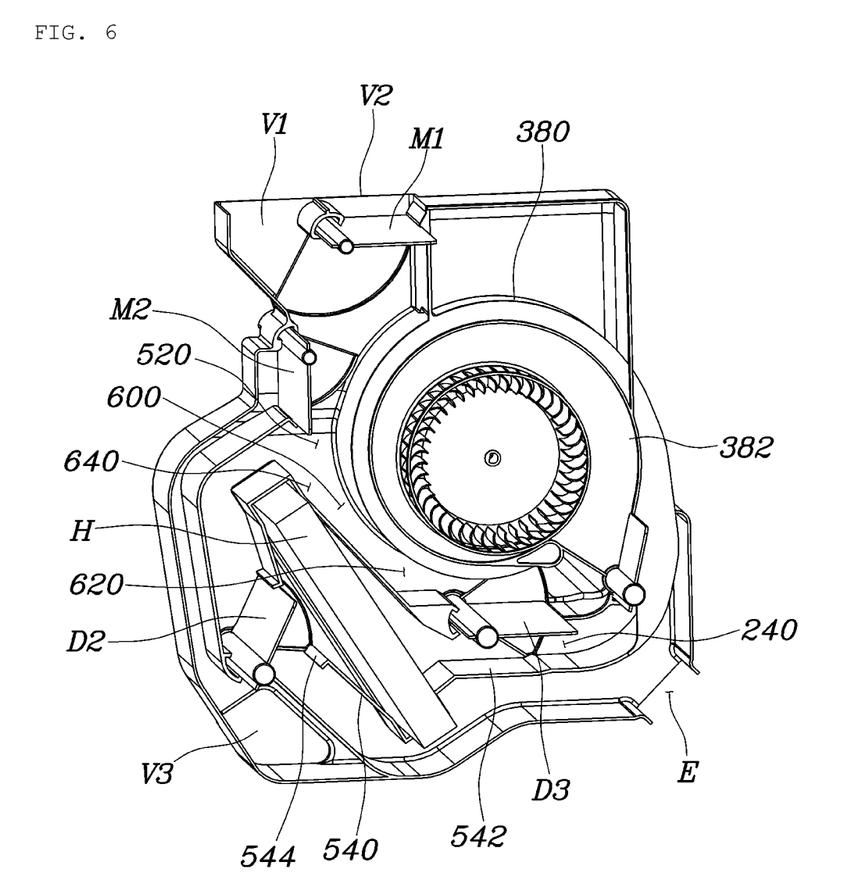
FIGS. 6 and 7 are views showing a side of the inside of the discharge housing of the air conditioning unit for a vehicle according to an embodiment of the present disclosure.
Figure 7:
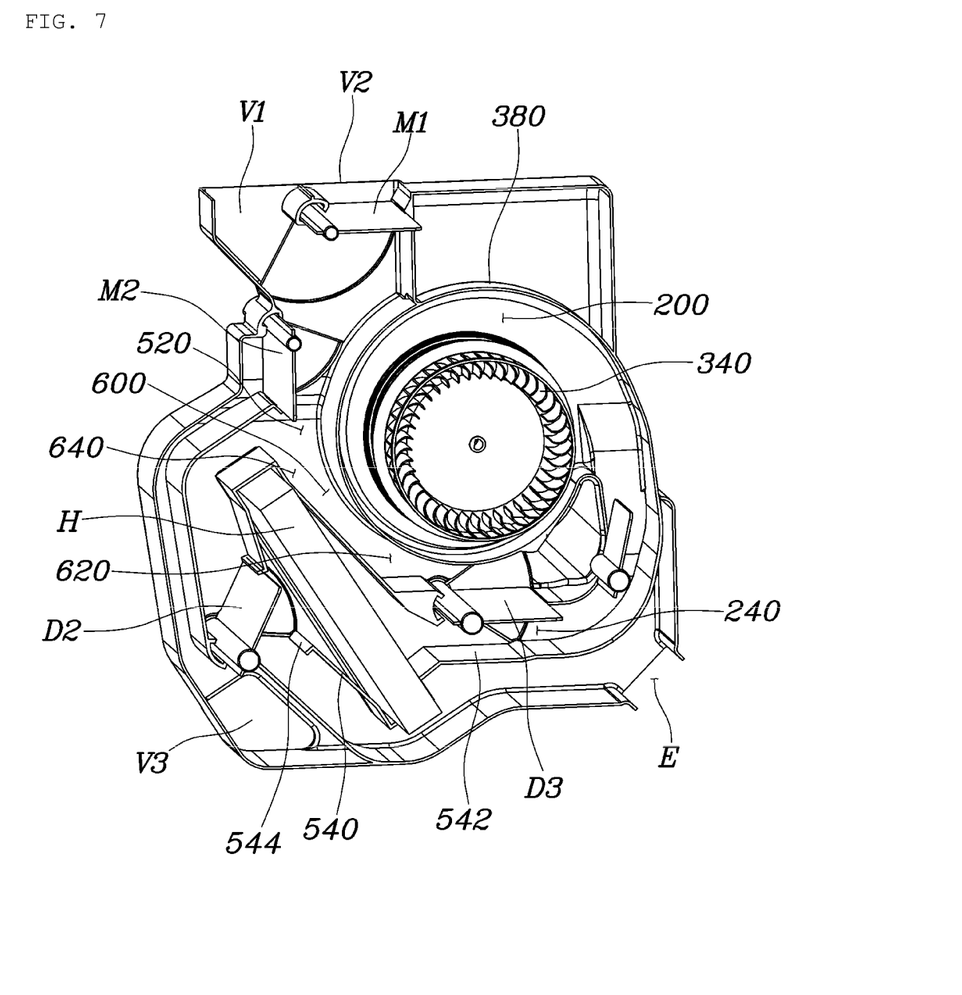
Figure 8:
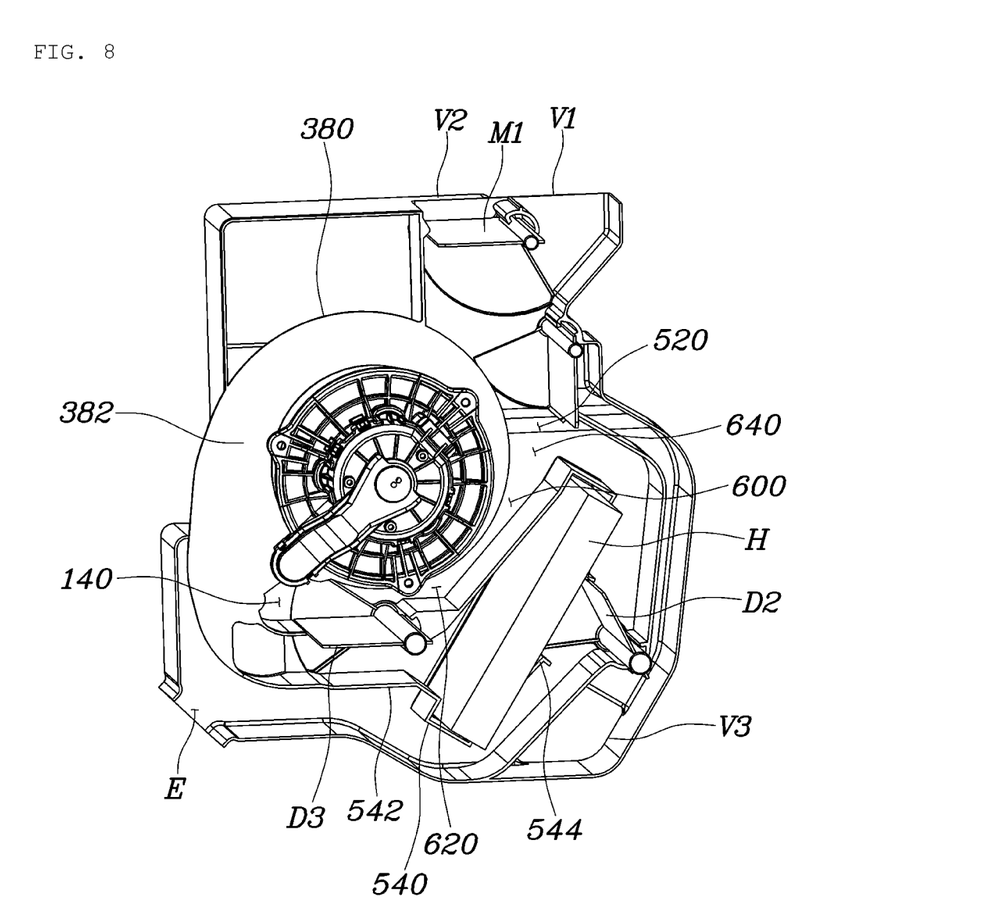
FIGS. 8 and 9 are views showing the other side of the inside of the discharge housing of the air conditioning unit for a vehicle according to an embodiment of the present disclosure.
Figure 9:
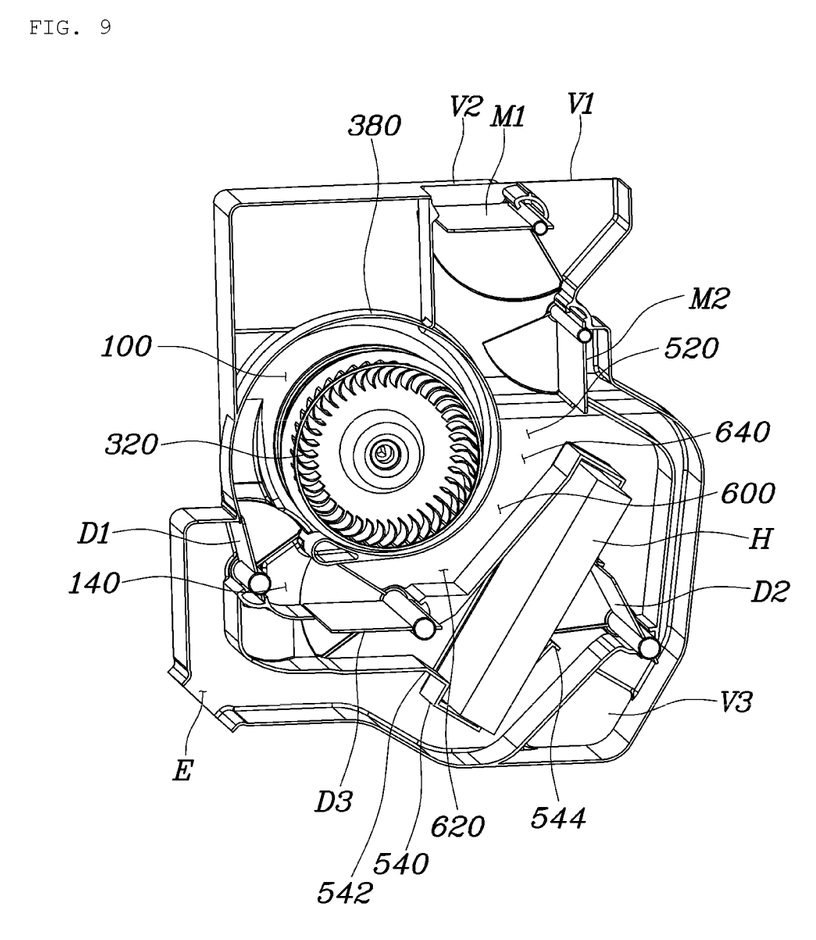

FIG. 1 is a diagram illustrating a configuration of an air conditioning unit for a vehicle according to an embodiment of the present disclosure. FIGS. 2 and 3 are perspective views of an air conditioning unit for a vehicle according to an embodiment of the present disclosure. FIG. 4 is a cross-sectional view of the air conditioning unit for the vehicle taken along line A-A shown in FIG. 2. FIG. 5 is a view showing a discharge housing of the air conditioning unit for a vehicle according to an embodiment of the present disclosure. FIGS. 6 and 7 are views showing a side of the inside of the discharge housing of the air conditioning unit for a vehicle according to an embodiment of the present disclosure. FIGS. 8 and 9 are views showing the other side of the inside of the discharge housing of the air conditioning unit for a vehicle according to an embodiment of the present disclosure.

FIG. 1 is a diagram illustrating the configuration of an air conditioning unit for a vehicle according to an embodiment of the present disclosure. The air conditioning unit for the vehicle of the present disclosure includes a cooling core C and a heating core H through which a refrigerant circulates. Although it is shown in the embodiment in the figure that the same refrigerant circulates through the cooling core C and the heating core H, the heat core may be a device through which a coolant for an engine flows or that is electrically heated. Alternatively, the cooling core and the heating core may be connected respectively to both sides of a thermoelectric element for heat transfer.

A representative embodiment of the present disclosure is an air conditioning unit for a vehicle that is applied to electric vehicles, in which, as shown in FIG. 1, there are lines for circulation of a refrigerant. The cooling core C and the heat core H are disposed on the lines. A compressor COMP and an expansion valve EX may be provided on the lines. That is, the cooling core C and the heat core H are, respectively, an evaporator and a condenser that are connected through a refrigerant line. The compressor COMP and the expansion valve EX may be included in the refrigerant line. Accordingly, according to the present disclosure, a refrigerant continuously flows through one line in only one direction, unlike existing heat pump systems that switch flow in refrigerant/cooling water lines, so the cooling core C is kept cold and the heat core H is kept hot. The cooling core C and the heat core H function only as an evaporator and a condenser, respectively.

FIGS. 2 and 3 are perspective views of an air conditioning unit for a vehicle according to an embodiment of the present disclosure. FIG. 4 is a cross-sectional view of the air conditioning unit for a vehicle taken along line A-A shown in FIG. 2. An air conditioning unit for a vehicle according to the present disclosure includes a first channel 100 and a second channel 200 having respective inlets 122 and 222 and respective outlets 140 and 240. The air conditioning unit includes a blowing unit 300 including a first blower fan 320 and a second blower fan 340, respectively disposed in the first channel 100 and the second channel 200 and rotating together by sharing a rotary shaft and a driving unit 360. The air conditioning unit includes a cooling core C disposed in the first channel 100 between the first blower fan 320 and the inlet 122 of the first channel 100. The air conditioning unit includes a heating core H disposed at the outlets 140 and 240 of the first channel 100 and the second channel 200. The air conditioning unit includes a bypass channel 600 disposed at a side of the heating core H to bypass the heating core H. The air conditioning unit includes a control door D3 disposed among the outlets 140 and 240 of the first channel 100 and the second channel 200, the heating core H, and the bypass channel 600 to control air discharged from the first channel 100 or the second channel 200 to pass through the heating core H or not to pass through the heating core H through the bypass channel 600.

In the air conditioning unit for a vehicle according to the present disclosure, air flows inside through two streams. That is, the air flows inside the first channel 100 and the second channel 200, each having an inlet and an outlet. The blowing unit 300 includes the first blower fan 320 and the second blower fan 340 disposed in the first channel 100 and the second channel 200, respectively. The first blower fan 320 and the second blower fan 340 rotate together by sharing a rotary shaft and the driving unit 360. Accordingly, a compact size can be achieved and the number of driving motors and motor drives is reduced, so the entire cost is decreased.

The cooling core C is disposed in the first channel 100 between the first blower fan 320 and the inlet 122 of the first channel 100. Accordingly, the air flowing inside through the first channel 100 flows always in a cooled state. The heating core H is disposed at the outlets of the first channel 100 and the second channel 200. Accordingly, the air flowing through the second channel 200 is heated through the heating core H. It is possible to perform interior heating by discharging the air flowing through the first channel 100 to the outside and using the air having passed through the heat core H through the second channel 200. In this process, heat is obtained by discharging the air that has passed through the cooling core C to the outside, which results in improvement of heating performance.

Further, interior cooling is performed by discharging the air having passed through the heating core H through the second channel 200 to the outside and by using the air flowing through the first channel 100. In this process, the heating core H functions as a condenser. The air flowing through the first channel 100 always passes through the cooling core so it is air with absolute humidity decreased. When the air passes again through the heating core H, the relative humidity is also reduced so the air can be used in a dehumidifying mode. To this end, the cooling core C is disposed in the first channel 100. However, the heating core H is disposed at the outlet 240 of the second channel 200 so that air can selectively flow.

In order to selectively temperature control and humidity control, the bypass channel 600 is disposed at a side of the heating core H to be able to bypass the heating core H. The control door D3 is disposed among the outlets 140 and 240 of the first channel 100 and the second channel 200, the heating core H, and the bypass channel 600 so that the air discharged from the first channel 100 or the second channel 200 flows into the interior after passing through the heating core H or flows into the interior through the bypass channel 600 without passing through the heat core H.

In order to achieve this configuration in a compact size, the air conditioning unit of the present disclosure is composed of an intake housing 400 and a discharge housing 500 in a broad sense. The intake housing 400 is a housing that receives air. The discharge housing 500 is a housing that discharges air to the interior or to the outside. The cooling core C is disposed in the first channel 100 of the intake housing 400 and the heating core H is disposed in the discharge housing 500. The blowing unit 300 and various doors are also disposed in the discharge housing 500.

In the embodiment shown in the figures, the intake housing 400 is coupled to a side of the discharge housing 500 such that the channel of air bends 90°. Further, in the embodiment, the cooling core C is disposed in the intake housing 400. The heating core H is disposed in the discharge housing 500. However, the scope of the present disclosure is not limited only to this shape and arrangement. Both the cooling core C and the heating core H may be disposed in the discharge housing 500. The blowing unit 300 may be disposed between the cooling core C and the heating core H such that the channel for air having passed through the cooling core C goes straight to the blowing unit 300 and the heating core H without bending.

The first channel 100 and the second channel 200 are formed across the interface between the intake housing 400 and the discharge housing 500. The air in the first channel 100 and the second channel 200 flows in separate channels until it is discharged through the blowing unit 300 after flowing into the channels. A first intake channel 120 and a second intake channel 220, each having an inlet and an outlet, are formed in the intake housing 400. The first intake channel 120 means the portion, which is formed in the intake housing 400, of the first channel 100. The second intake channel 220 means the portion, which is formed in the intake housing 400, of the second channel 200. A blowing chamber 380 divided into two spaces is formed in the discharge housing 500. The first blower fan 320 and the second blower fan 340 are disposed in the spaces of the blowing chamber 380, respectively. The outlet 124 of the first intake channel 120 communicates with an inlet E1 of the space in which the first blower fan 320 is disposed, thereby forming the first channel 100. The outlet 224 of the second intake channel 220 communicates with an inlet E2 of the space in which the second blower fan 340 is disposed, thereby forming the second channel 200.

As shown in FIGS. 2 and 4, a door is disposed at each of the inlets 122 and 222 of the first intake channel 120 and the second intake channel 220, so the air flowing into the first intake channel 120 and the second intake channel 220 can be selected as internal air or external air of the vehicle. The air flowing through the first intake channel 120 is allowed to flow to the cooling core C.

The air flowing in the intake housing 400 flows into a side of the discharge housing 500, as shown in FIGS. 4 and 5. The first blower fan 320 is disposed close to the intake housing 400 in the blowing chamber 380 disposed in the discharge housing 500. The second blower fan 340 is disposed far from the intake housing 400 in the blowing chamber 380. The outlet 124 of the first intake channel 120 may be directly connected to the first blower fan 320. The outlet 224 of the second intake channel 220 may be connected to the second blower fan 340 at the opposite side after going around the blowing chamber 380. That is, as shown in FIG. 5, the outlet 124 of the first intake channel 120 is connected to the first blower fan 320. The air flowing through the second intake channel 220 flows into the discharge housing 500 through a hole H, as shown in the figure. As shown in FIG. 4, the air flows around the blowing chamber 380 and then flows into the second blower fan 340 from the back. The intake housing 400 can be coupled to a side of the discharge housing 500. The driving unit 360 for the blowing unit can be coupled to the other side. By this structure, the first blower fan 320 and the second blower fan 340 can be arranged to overlap each other, the rotary shaft can be shared, and the blower driving unit 360 can also be shared so the number of parts can be reduced. Further, the size of the entire discharge housing 500 can be considerably decreased.

Meanwhile, as shown in FIGS. 8 and 9, a first opening door D1 that communicates with the outside is disposed at the outlet 140 of the first channel 100. The blowing chamber 380 is divided into two spaces by a blowing separation wall 382. The first blower fan 320 and the second blower fan 340 are disposed in the spaces, respectively. In the insides covered with the blowing separation wall 382 in FIG. 8, air is blown by the first blower fan 320 to the outlet 140 of the first channel 100. In this process, when the first opening door D1 is opened, air that has passed through the cooling core C and the first blower fan 320 is discharged to the outside. When the first opening door D1 is closed, air can be sent to the control door D3. The inside with the blowing separation wall 382 is shown in FIG. 8 and removed is shown in FIG. 9. By this structure, it is possible to discharge the air cooled through the cooling core C to the outside in heating. It is also possible to use the air by sending the air to the control door D3 in cooling or dehumidifying.

Further, as shown in FIGS. 6 and 7, a second opening door D2 that communicates with the outside is disposed at a downstream side from the heating core H. When the second opening door D2 is opened, air that passed through the heating core H is discharged to the outside. When the second opening door D2 is closed, the air that has passed through the heating core H can be discharged into the vehicle. Accordingly, it is possible to discharge the air that has passed through the heating core H in cooing. It is also possible to use the air in heating or dehumidifying. According to this structure, it is possible to perform cooling, heating, mixing, and dehumidifying. To this end, the first opening door D1 is disposed at the outlet 140 of the first channel 100. The second opening door D2 is disposed at the downstream side from the heating core H.

As shown in FIG. 4, the intake housing 400 is divided into the first intake channel 120 and the second intake channel 220 by an intake separation wall 420. A selection door D4 is disposed at a downstream side of the separation wall from the cooling core C. When the selection door D4 is opened, the first intake channel 120 and the second intake channel 220 are isolated. When the selection door D4 is closed, the air that has flowed through the cooling core C can flow into the first blower fan 320 and the second blower fan 340 through the first intake channel 120 and the second intake channel 220. Since the air that has flowed through the cooling core C flows into both the first blower fan 320 and the second blower fan 340 by the selection door D4, it is possible to secure sufficient air flow and efficiency in cooling or dehumidifying. It is also possible to secure maximum heating efficiency in heating by completely isolating the two channels.

A discharge chamber 520 for discharging air into the vehicle and mode doors M1 and M2 installed at the discharge chamber 520 are provided in the discharge housing 500. A core chamber 540 having the heating core H therein is formed. An inlet 542 of the core chamber 540 and an inlet 620 of the bypass channel 600 are disposed toward the outlet of the blowing chamber 380. The control door D3 is disposed among the inlet 542 of the core chamber, the inlet 620 of the bypass channel, and the outlet of the blowing chamber, thereby being able to achieve various modes. First, it is possible to discharge the air flowing in the discharge chamber 520 to the body V1 of a passenger or to a windshield glass V2 by controlling the first mode door M1 and to discharge the air to a floor V3 by controlling the second mode door M2.

The bypass channel 600 is formed in the space between the core chamber 540 and the blowing chamber 380 outside the core chamber 540. The outlet 640 of the bypass channel 600 can be connected to the discharge chamber 520. The second opening door D2 that communicates with the outside is disposed at the outlet 542 of the core chamber 540. When the second opening door D2 is opened, the air that has passed through the heating core H can be discharged to the outside through the hole E. When the second opening door D2 is closed, the air that has passed through the heating core H can be discharged to the discharge chamber 520. The first opening door D1 that communicates with the outside is disposed at the outlet 140 of the space in which the first blower fan 320 is disposed in the blowing chamber 380. When the first opening door D1 is opened, the air that has passed through the first blower fan 320 can be discharged to the outside. When the first opening door D1 is closed, the air that has passed through the first blower fan 320 can be discharged to the control door D3.

A method of achieving various modes according to the air conditioning unit for a vehicle of the present disclosure is described hereafter. First, efficiency is secured by closing the selection door D4 in a cooling mode. Further, the air in the first channel 100 is used for cooling by closing the first opening door D1. The cold air discharged through the first channel 100 is used for interior air-conditioning through the discharge chamber 520 by putting the control door D3 at a neutral position. The cold air discharged through the second channel 200 is allowed to flow through the heating core H and is then discharged to the outside by opening the second opening door D2, thereby pursuing maximum cooling efficiency.

In a heating mode, cold air and normal air are separated by opening the selection door D4. The cold air in the first channel 100 is discharged to the outside by opening the first opening door D1. Only the air in the second channel 200 is sent into the heating core H through the control door D3. Hot air is used for interior heating by closing the second opening door D2. In a dehumidifying mode, air is heated after cooled to be used for dehumidifying by keeping the first opening door D1 closed.

According to the air conditioning unit for the vehicle, it is possible to perform cooling/heating while switching air channels without using a heat pump system that changes a refrigerant and to integrate a blower motor by integrating cooling and heating systems, unlike existing air conditioning systems.

Although the present disclosure was provided above in relation to specific embodiments shown in the drawings, it is apparent to those having ordinary skill in the art that the present disclosure may be changed and modified in various ways without departing from the scope of the present disclosure, which is described in the following claims.

What is claimed is:
1. An air conditioning unit for a vehicle comprising:
   a first channel having an inlet and an outlet and a second channel having an inlet and an outlet;
   a blowing unit including a first blower fan and a second blower fan that are respectively disposed in the first channel and the second channel and that rotate together by sharing a rotary shaft and a driving unit;
   a cooling core disposed in the first channel between the first blower fan and the inlet of the first channel;
   a heating core disposed at the outlet of the first channel and the outlet of the second channel;
   a bypass channel disposed at a side of the heating core to bypass the heating core; and
   a control door disposed among the outlet of the first channel, the outlet of the second channel, the heating core, and the bypass channel to control air discharged from the first channel or the second channel to pass through the heating core or not to pass through the heating core through the bypass channel.

2. The air conditioning unit of claim 1, wherein a first opening door that communicates with an outside is disposed at the outlet of the first channel, wherein air that has passed through the cooling core is discharged to the outside when the first opening door is opened, and wherein the air that has passed through the cooling core is discharged to the control door when the first opening door is closed.

3. The air conditioning unit of claim 1, wherein a second opening door that communicates with an outside is disposed at a downstream position from the heating core, wherein air that has passed through the heating core is discharged to the outside when the second opening door is opened, and wherein the air that has passed through the heating core is discharged to an inside of the vehicle when the second opening door is closed.

4. The air conditioning unit of claim 1, wherein the cooling core and the heating core are, respectively, an evaporator and a condenser that are connected through a refrigerant line, and
wherein a compressor and an expansion valve are included in the refrigerant line.

5. The air conditioning unit of claim 1, further comprising an intake housing and a discharge housing coupled to a side of the intake housing,
wherein a first intake channel having an inlet and an outlet and a second intake channel having an inlet and an outlet are formed in the intake housing, wherein a blowing chamber divided into two spaces is formed in the discharge housing, wherein the first blower fan and the second blower fan are disposed in the spaces of the blowing chamber, respectively, wherein the outlet of the first intake channel communicates with an inlet of the space in which the first blower fan is disposed, thereby forming the first channel, and wherein the outlet of the second intake channel communicates with an inlet of the space in which the second blower fan is disposed, thereby forming the second channel.

6. The air conditioning unit of claim 5, wherein the cooling core is disposed in the first intake channel, the first blower fan is disposed close to the intake housing in the blowing chamber, the second blower fan is disposed far from the intake housing in the blowing chamber, the outlet of the first intake channel is directly connected to the first blower fan, and the outlet of the second intake channel is connected to the second blower fan at an opposite side after going around the blowing chamber.

7. The air conditioning unit of claim 5, wherein the intake housing is coupled to a side of the discharge housing and the driving unit for the blowing unit is coupled to another side of the discharge housing.

8. The air conditioning unit of claim 5, wherein the intake housing is divided into the first intake channel and the second intake channel by an intake separation wall and wherein a selection door is disposed at a downstream side of the separation wall from the cooling core,
wherein when the selection door is opened, the first intake channel and the second intake channel are isolated, and
wherein when the selection door is closed, the air that has flowed through the cooling core flows into the first blower fan and the second blower fan through the first intake channel and the second intake channel.

9. The air conditioning unit of claim 5, wherein a first opening door that communicates with an outside is disposed at an outlet of the space in which the first blower fan is disposed, air that has passed through the first blower fan is discharged to the outside when the first opening door is opened, and the air that has passed through the first blower fan is discharged to the control door when the first opening door is closed.

10. The air conditioning unit of claim 5, wherein a discharge chamber for discharging air into the vehicle and mode doors installed at the discharge chamber are provided in the discharge housing, a core chamber having the heating core therein is formed, an inlet of the core chamber and an inlet of the bypass channel are disposed toward the outlet of the blowing chamber, and the control door is disposed among the inlet of the core chamber, the inlet of the bypass channel, and the outlet of the blowing chamber.

11. The air conditioning unit of claim 10, wherein the bypass channel is formed outside the core chamber and an outlet of the bypass channel is connected to the discharge chamber.

12. The air conditioning unit of claim 10, wherein a second opening door that communicates with an outside is disposed at an outlet of the core chamber, wherein air that has passed through the heating core is discharged to the outside when the second opening door is opened, and wherein the air that has passed through the heating core is discharged to the discharge chamber when the second opening door is closed.

* * * * *